United States Patent
Li

(10) Patent No.: US 10,236,975 B2
(45) Date of Patent: Mar. 19, 2019

(54) PROGRAMMABLE PHOTONIC-ELECTRONIC INTEGRATED CIRCUIT FOR OPTICAL TESTING

(71) Applicant: INTEL CORPORATION, Santa Clara, CA (US)

(72) Inventor: Peng Li, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/430,053

(22) Filed: Feb. 10, 2017

(65) Prior Publication Data

US 2018/0234177 A1 Aug. 16, 2018

(51) Int. Cl.
| | |
|---|---|
| *H04B 10/077* | (2013.01) |
| *H04B 10/079* | (2013.01) |
| *H04B 10/073* | (2013.01) |
| *H04B 10/071* | (2013.01) |
| *H04B 10/40* | (2013.01) |

(52) U.S. Cl.
CPC ..... *H04B 10/07953* (2013.01); *H04B 10/071* (2013.01); *H04B 10/077* (2013.01); *H04B 10/0731* (2013.01); *H04B 10/40* (2013.01)

(58) Field of Classification Search
None
See application file for complete search history.

(56) References Cited

U.S. PATENT DOCUMENTS

| | | | |
|---|---|---|---|
| 5,077,729 A | 12/1991 | Wong | |
| 6,676,304 B1 | 1/2004 | Coin et al. | |
| 6,950,972 B2* | 9/2005 | Liu | G01R 31/3171 398/27 |
| 6,959,126 B1* | 10/2005 | Lofland | G01M 11/335 385/16 |
| 8,138,778 B1* | 3/2012 | Smith | G01R 31/2822 324/756.02 |
| 8,583,395 B2 | 11/2013 | Dybsetter et al. | |
| 8,811,815 B2 | 8/2014 | Xia et al. | |
| 9,013,687 B2 | 4/2015 | Rudmann et al. | |
| 2003/0112425 A1* | 6/2003 | Franke | G01M 11/33 356/73.1 |

(Continued)

*Primary Examiner* — Li Liu
(74) *Attorney, Agent, or Firm* — Compass IP Law PC

(57) ABSTRACT

The present disclosure provides a programmable integrated circuit die for optical testing. The integrated circuit die includes both photonic and electronic elements. In particular, the integrated circuit die may include a memory block, a programmable logic block (for example, a field programmable gate array), an electrical transceiver block, an optical transceiver block, and an optical test interface unit. The programmable logic block may be programmed to have logic functionalities of an embedded microcontroller and of various encoders/decoders. The logic functions may be soft, hard, or mixed. The memory may be used to store test patterns, look-up tables, measured waveforms, error time profiles and statistics. The electrical and optical transceivers may implement PAMn, NRZ, or QAMn modulations and may have programmable parameters, including: voltage levels; optical power; slew rate; magnitude/phase; clock generation and recovery; equalizations; sampling levels; and sampling times. Other embodiments and features are also disclosed.

15 Claims, 2 Drawing Sheets

(56) References Cited

U.S. PATENT DOCUMENTS

| | | | |
|---|---|---|---|
| 2003/0189701 A1* | 10/2003 | Franke | G01M 11/332 356/73.1 |
| 2004/0001194 A1* | 1/2004 | Wilstrup | G01M 11/333 356/73.1 |
| 2004/0090616 A1* | 5/2004 | French | H04B 10/07 356/73.1 |
| 2004/0153267 A1* | 8/2004 | Fishman | H04B 10/07 702/69 |
| 2004/0168111 A1* | 8/2004 | Arnold | G06F 11/3664 714/57 |
| 2008/0226288 A1* | 9/2008 | Miller | H04B 10/073 398/9 |
| 2013/0162279 A1* | 6/2013 | Achkir | H04L 1/241 324/756.02 |
| 2014/0059384 A1* | 2/2014 | Tran | G01R 31/3171 714/32 |
| 2014/0254647 A1* | 9/2014 | Stott | H04L 43/50 375/224 |
| 2015/0003505 A1* | 1/2015 | Lusted | H04L 25/4917 375/224 |
| 2017/0359120 A1* | 12/2017 | Jacobs | H04B 10/0795 |

* cited by examiner

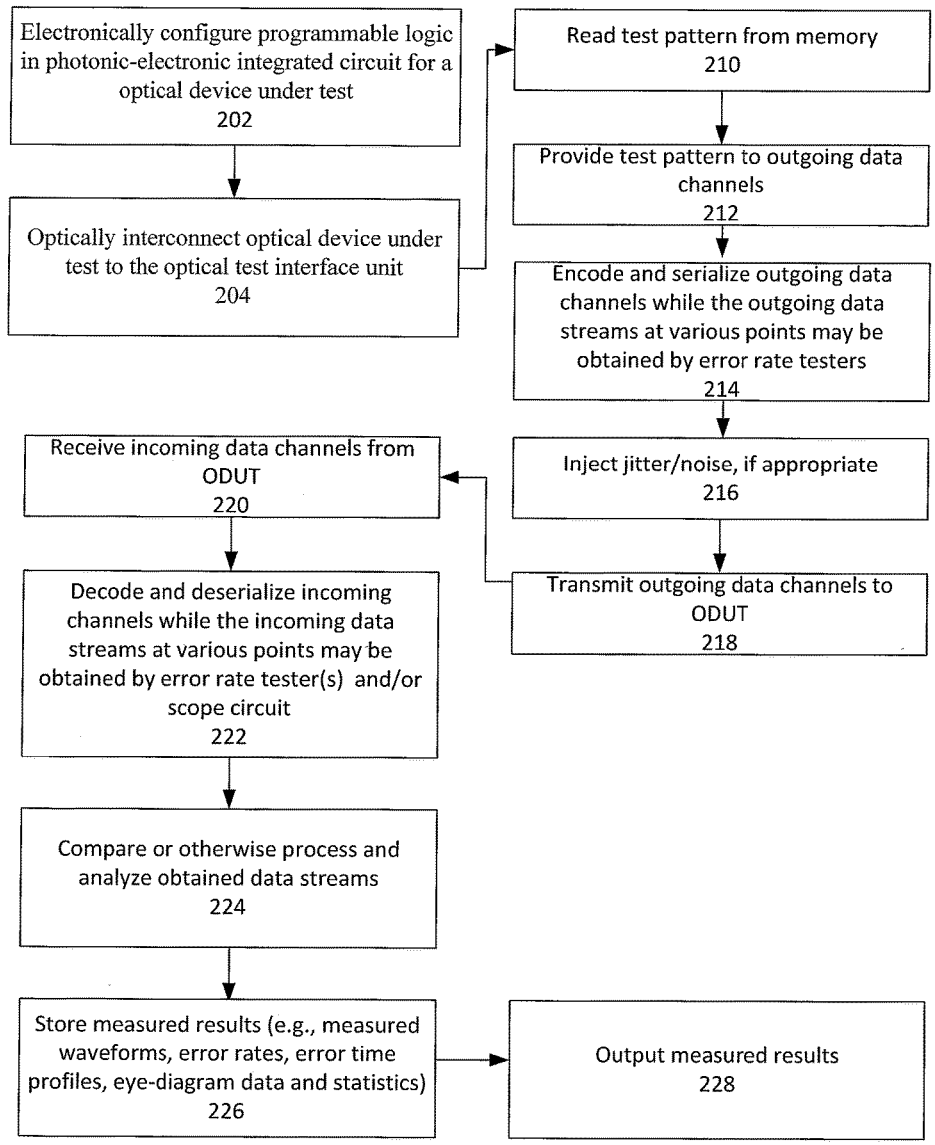
FIG. 2    200

PROGRAMMABLE PHOTONIC-ELECTRONIC INTEGRATED CIRCUIT FOR OPTICAL TESTING

BACKGROUND

Technical Field

The present disclosure relates to optical communications and optical testing.

Description of the Background Art

An optical communication system may have several tens or hundreds of optical channels that require parallel testing coverage and throughput. As such, optical test and validation requirements are becoming increasingly challenging, and conventional optical testers have growing difficulties meeting these optical testing requirements. Hence, satisfying these requirements has become a pressing issue to be solved.

BRIEF DESCRIPTION OF THE DRAWINGS

FIG. 2 is a flow chart of an exemplary method of field programmable optical testing in accordance with an embodiment of the invention.

DETAILED DESCRIPTION

Figure 1:
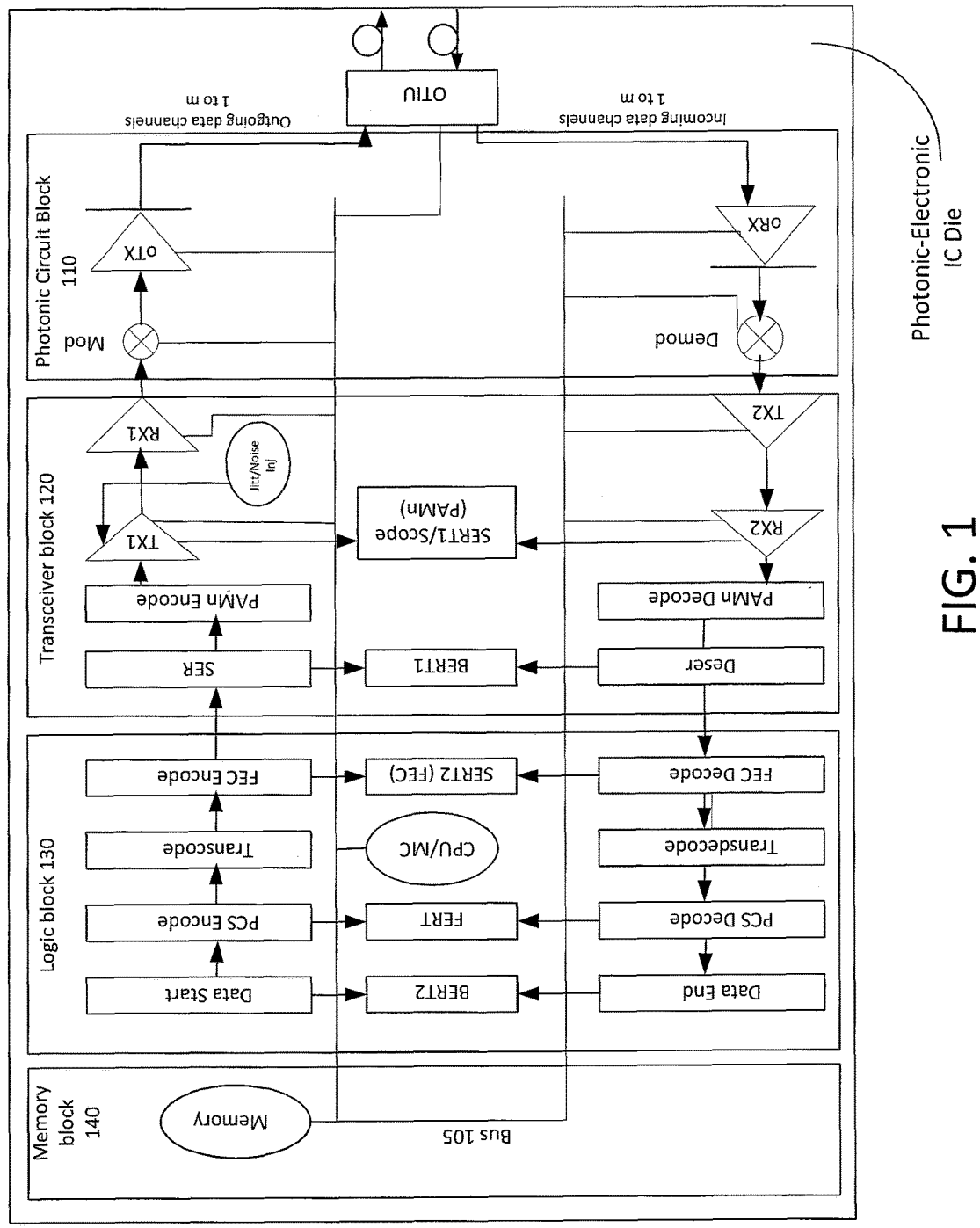
FIG. 1 depicts a programmable photonic-electronic integrated circuit 100 for optical testing in accordance with an embodiment of the invention.

The presently-disclosed solution provides a programmable integrated circuit die for optical testing that includes both photonic and electronic elements. Due to its programmability reconfigurability, this solution is highly flexible.

The presently-disclosed solution has various functionalities. These functionalities include: optical power generation with NRZ, PAMn, and QAMn modulation capabilities, and timing jitter and/or phase jitter and/or amplitude noise injection; multiple error rate testing functions, including optical bit error rate testing (oBERT), optical symbol error rate testing (oSERT), and optical frame error rate testing (oFERT); optical waveform measurements; optical eye-diagram and constellation-diagram measurements; optical power measurements; extinction ratio measurements; and optical modulation amplitude (OMA) tests/measurements.

This solution is advantageously scalable to at least hundreds of channels and data rates of at least several to several tens terabits per second. Several further benefits and advantages of this solution: wide test coverage; rapid testing for reduced time to market; a small footprint and high density due to its implementation of an optical tester on a single chip; extendibility; scalability; reliability; and high performance at reduced cost and low power consumption.

FIG. 1 depicts a programmable photonic-electronic integrated circuit die 100 for optical testing in accordance with an embodiment of the invention. The optical tester 100 includes an optical test interface unit (OTIU), a photonic circuit block 110, a transceiver block 120, a logic block 130, and a memory block 140. In one embodiment of the invention, the optical tester 100 may be implemented in a single-chip integrated photonic-electronic integrated chip that includes electronically programmable logic.

The OTIU provides an interface with the optical device under test (ODUT). Multiple outgoing data channels (Outgoing data channels 1 to m) are transmitted from the OTIU to the ODUT, and multiple incoming data channels (Incoming data channels 1 to m) are received by the OTIU from the ODUT. The outgoing and incoming data channels may number in the tens to hundreds (or more), and these multiple data channels may be tested in parallel in accordance with an embodiment of the present invention.

The photonics circuit block 110 includes a modulator (Mod) circuit and an optical transmitter (oTX) circuit. The modulator circuit receives multiple outgoing data channels from the transceiver block 120 and may modulate these multiple outgoing data channels using modulation signals received via the communication bus 105. The optical transmitter circuit receives the outgoing data channels as electronic signals from the modulator circuit, and outputs the outgoing data channels as optical signals to the OTIU.

The photonics circuit block 110 further includes an optical receiver (oRX) circuit and a demodulator (Demod) circuit. The optical receiver circuit receives the incoming data channels as optical signals from the OTIU, and outputs the incoming data channels as electronic signals to the demodulator circuit. The demodulator circuit receives multiple incoming data channels from the optical receiver circuit and may demodulate these multiple incoming data channels using demodulation signals received via the communication bus 105.

The transceiver block 120 may include a serializer (SER) circuit, an n-level pulse amplitude modulation encoder (PAMn or QAMn Encode) circuit, a first transmitter (TX1) circuit, a first receiver (RX1) circuit, and a jitter/noise injector (Jitt/Noise Inj) circuit. Together, the TX1 and RX1 circuits form a first transceiver circuit.

Note that, instead of applying PAMn or QAMn encoding/decoding as depicted in FIG. 1, non-return-to-zero (NRZ) modulation encoding/decoding may be applied. The form of the modulation used may be programmatically configured.

The serializer circuit receives the outgoing data channels from the logic block 130, each channel being received in parallel form at a width of a data word. The serializer circuit serializes each of the outgoing data channels, and outputs the serialized outgoing data channels to the PAMn or QAMn Encode circuit, which outputs the n-level PAM or n-constellation QAM encoded outgoing data channels to the TX1 circuit. The TX1 circuit transmits the multiple outgoing data channels to the RX1 circuit, which outputs the multiple outgoing data channels to the modulator circuit in the photonics circuit block 110. The jitter/noise injector circuit may be used to generate a jitter or other noise signal and selectively inject the jitter/noise signal to one or more (or all) of the outgoing data channels at the transmitter circuit.

The transceiver block 120 may further include a second transmitter (TX2) circuit, a second receiver (RX2) circuit, an n-level pulse amplitude modulation decoder (PAMn Decode) or an n constellation quadrature amplitude modulation decoder (QAMn Decode) circuit, and a deserializer (Deser) circuit. Together, the TX2 and RX2 circuits form a second transceiver circuit.

The TX2 circuit receives the multiple incoming data channels from the demodulator circuit in the photonics circuit block 110. The TX2 circuit transmits the multiple incoming data channels to the RX2 circuit, which outputs the multiple incoming data channels to the PAMn or QAMn Decode circuit. The PAMn or QAMn Decode circuit decodes the n-level PAM or n-constellation QAM encoded incoming data channels and outputs them as serial streams to the deserializer circuit. The deserializer circuit receives the incoming data channels in serial form and outputs them in parallel form at a width of a data word to the logic block 130.

The transceiver block 120 may further include a first bit error rate tester (BERT1) circuit, a first symbol error rate tester (SERT1) circuit and a scope circuit. These circuits may be used to perform various testing and analysis functionalities as described below.

The BERT1 circuit may receive an outgoing data stream before it is serialized by the serializer circuit and an incoming data stream as output by the deserializer circuit, where the outgoing and incoming serial input streams pertain to the same data stream, such as the data stream of a test pattern that is sent from the OTIU to the ODUT and received back by the OTIU from the ODUT. These two serial input streams may be compared by the BERT1 circuit to obtain a bit error rate.

The SERT1 circuit may receive an outgoing PAMn or QAMn symbol input stream from the TX1 circuit and an incoming PAMn or QAMn symbol input stream from the RX1 circuit, where the outgoing and incoming PAMn or QAMn symbol input streams pertain to the same data stream, such as the data stream of a test pattern that is sent from the OTIU to the ODUT and received back by the OTIU from the ODUT. These two symbol inputs may be compared by the SERT1 circuit to obtain a symbol error rate.

The scope circuit may receive an incoming PAMn or QAMn signal from the RX1 circuit. The scope circuit may sample the PAMn or QAMn signal to generate data for an eye opening diagram or constellation diagram. This data may be stored in the memory and then output for use in generating an eye opening diagram or constellation diagram, which may be displayed on a monitor, for example.

The logic block 130 may include a data start block, a physical coding sublayer encoder (PCS Encode) circuit, a transcode (Transcode) circuit, and a forward error correction encoder (FEC Encode) circuit. The data start block provides the outgoing data channels to the PCS Encode circuit. The PCS Encode circuit performs encoding functionalities that may include scrambling, alignment marker insertion, and so on. The transcode circuit may be used to convert the outgoing data channels to a coding that is suitable for input into the FEC Encode circuit. Finally, the FEC Encode circuit applies forward error correction encoding to the outgoing data channels and outputs the FEC encoded channels to the transceiver block 120.

The logic block 130 may further include a data end block, a physical coding sublayer decoder (PCS Decode) circuit, a transdecode (Transdecode) circuit, and a forward error correction decoder (FEC Decode) circuit. The FEC Decode circuit applies forward error correction decoding to the deserialized incoming data channels and outputs the FEC decoded channels to the transdecoder. The transdecode circuit may be used to convert the FEC-decoded incoming data channels to a form suitable for input into the PCS Decode circuit. The PCS Decode circuit performs decoding functionalities that may include descrambling, alignment marker removal, and so on. Finally, the PCS Decode circuit provides the incoming data channels to the data end block.

The logic block 130 may further include a second bit error rate tester (BERT2) circuit, a frame error rate tester (FERT), a second symbol error rate tester (SERT2) circuit, and an embedded microcontroller (CPU/MC). These circuits may be used to perform various testing functionalities as described below.

The BERT2 circuit may receive an outgoing data word stream from the data start block and an incoming data word stream from the data end block, where the outgoing and incoming data words pertain to the same data stream, such as the data stream of a test pattern that is sent from the OTIU to the ODUT and received back by the OTIU from the ODUT. These two data streams may be compared by the BERT2 circuit to obtain a bit error rate.

The FERT circuit may receive an outgoing PCS-encoded data stream from the FEC Encode circuit and an incoming PCS-encoded data stream before it is decoded by the FEC Decode circuit, where the outgoing and incoming PCS-encoded data streams pertain to the same data stream, such as the data stream of a test pattern that is sent from the OTIU to the ODUT and received back by the OTIU from the ODUT. These two PCS-encoded data streams may be compared by the FERT circuit to obtain a frame error rate.

The SERT2 circuit may receive an outgoing FEC symbol stream from the FEC Encode circuit and an incoming FEC symbol stream before it is processed by the FEC Decode circuit, where the outgoing and incoming FEC symbol streams pertain to the same data stream, such as the data stream of a test pattern that is sent from the OTIU to the ODUT and received back by the OTIU from the ODUT. These two symbol streams may be compared by the SERT2 circuit to obtain a symbol error rate.

The embedded microcontroller (CPU/MC) may be used to control the components of the photonic-electronic IC die 100 to achieve the desired optical testing functionalities. The embedded microcontroller is communicatively interconnected via the bus communication system 105 to the memory in the memory block 140, the TX1, TX2, RX1 and RX2 circuits in the transceiver block 120, and the Mod, oTX, Demod and oRX circuits in the photonic circuit block 110, and the OTIU.

The memory in the memory block 140 stores, and provides access to data. The embedded microcontroller executes instruction code and may store and access data from the memory. The bus system is used to communicatively interconnect at least the memory, the processor, the first transceiver in the first series of circuits, the second transceiver in the second series of circuits, and the optical test interface unit.

FIG. 2 is a flow chart of an exemplary method 200 of field programmable optical testing in accordance with an embodiment of the invention. This method 200 may be performed, for example, using the photonic-electronic integrated circuit 100 of FIG. 1.

Per step 202, programmable logic in the photonic-electronic integrated circuit may be electronically configured for a specific type of optical device under test. For example, encoder and decoder circuits and error rate tester circuits in a programmable logic block may be customized to perform specific encodings/decodings (including PCS, FEC, and MAC encodings/decodings, for example) and specific error rate testing, and particular test patterns and look-up tables may be loaded into memory for use in the testing.

Per step 204, the optical test interface unit of the photonic-electronic integrated circuit may be optically interconnected with an optical device under test. The optical device under test may be, for example, a pre-assembled optical component or a post-assembled optical module or optical system.

A test pattern of data may be read from memory per step 210, and the test pattern may be provided to a plurality of outgoing data channels per step 212. Per step 214, the outgoing data channels may be encoded and serialized while the outgoing data streams at various points in the processing may be obtained by the error rate testers.

Per step 216, jitter or other noise may be injected into the plurality of outgoing data channels. This injection step may be optional in that its necessity may depend on the optical testing to be performed on the optical device under test.

The plurality of outgoing channels may be transmitted via the optical transmitter and OTIU to the ODUT per step per step 218. In this example, the ODUT returns a plurality of incoming channels per step 220.

Per step 222, the incoming data channels may be decoded and deserialized while the incoming data streams at various points in the processing may be obtained by the error rate testers and the scope circuit. Per step 224, the obtained data may be compared and otherwise processed and analyzed.

Per step 226, the measured results may be stored. These measured results may include, for example, measured waveforms, error rates, error time profiles, eye-diagram data, constellation diagram data and statistics. Lastly, per step 228, the measured results may be output. Subsequently, the measured results may be viewed and otherwise utilized by the user.

CONCLUSION

The presently-disclosed solution provides a programmable integrated circuit die for optical testing. The integrated circuit die includes both photonic and electronic elements. In particular, the integrated circuit die may include a memory block, a programmable logic block (for example, a field programmable gate array), an electrical transceiver block, an optical transceiver block, and an optical test interface unit.

The programmable logic block may be programmed to have logic functionalities of an embedded microcontroller and of various encoders/decoders. The logic functions may be soft, hard, or mixed. The memory may be used to store test patterns, look-up tables, measured waveforms, error rates, error time profiles, eye-diagram data, and statistics. The electrical and optical transceivers may implement higher-order modulation such as PAMn, or NRZ, or QAMn modulations and may have programmable parameters, including: voltage levels; optical power; slew rate; magnitude; phase; clock generation and recovery; equalizations; sampling levels; and sampling times.

One embodiment relates to a programmable photonic-electronic integrated circuit for optical testing. An optical test interface unit transmits a plurality of outgoing data channels to, and receives a plurality of incoming data channels from, an optical device under test. An optical transmitter circuit modulates and transmits the plurality of outgoing data channels to the optical test interface unit, and an optical receiver circuit receives and demodulates the plurality of outgoing data channels from the optical test interface unit. A first series of circuits programmably encodes and serializes the plurality of outgoing data channels, and a second series of circuits deserializes and programmably decodes the plurality of input data channels. One or more programmable error rate tester circuits compare outgoing data from the first series of circuits and incoming data from the second series of circuits to determine a plurality of error rates.

Other embodiments and features are also disclosed.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A programmable photonic-electronic integrated circuit for optical testing, the programmable photonic-electronic integrated circuit comprising:
   an optical test interface unit that transmits a plurality of outgoing data channels to, and receives a plurality of incoming data channels from, an optical device under test;
   an optical transmitter circuit that modulates and transmits the plurality of outgoing data channels to the optical test interface unit;
   an optical receiver circuit that receives and demodulates the plurality of outgoing data channels from the optical test interface unit;
   a first series of circuits that programmably encodes and serializes the plurality of outgoing data channels;
   a second series of circuits that deserializes and programmably decodes the plurality of input data channels; and
   one or more programmable error rate tester circuits that compare outgoing data from the first series of circuits and incoming data from the second series of circuits to determine a plurality of error rates.

2. The programmable photonic-electronic integrated circuit of claim 1, wherein the one or more programmable error rate tester circuits comprise a symbol error rate tester circuit, and wherein the symbol error rate tester circuit receives a first symbol stream from a transmitter circuit in the first series of circuits and a second symbol stream from a receiver circuit in the second series of circuits.

3. The programmable photonic-electronic integrated circuit of claim 1, wherein the one or more programmable error rate tester circuits comprise a bit error rate tester circuit, and wherein the bit error rate tester circuit receives a first data stream before from an input of a serializer circuit in the first series of circuits and a second data stream from an output of a deserializer circuit in the second series of circuits.

4. The programmable photonic-electronic integrated circuit of claim 1, wherein the one or more programmable error rate tester circuits comprise a symbol error rate tester, and wherein the symbol error rate tester circuit receives a first symbol stream from an output of a forward error correction encoding circuit in the first series of circuits and a second symbol stream from an input of a forward error correction decoding circuit in the second series of circuits.

5. The programmable photonic-electronic integrated circuit of claim 1, wherein the one or more programmable error rate tester circuits comprise a frame error rate tester circuit, and wherein the frame error rate tester circuit receives a first encoded data stream from an output of a physical coding sublayer encoding circuit in the first series of circuits and a second encoded data stream from an input of a physical coding sublayer decoding circuit in the second series of circuits.

6. The programmable photonic-electronic integrated circuit of claim 1, wherein the one or more programmable error rate tester circuits comprise a bit error rate tester circuit, and wherein the bit error rate tester circuit receives a first data stream from a data start block of the first series of circuits and a second data stream from a data end block of the second series of circuits.

7. The programmable photonic-electronic integrated circuit of claim 1, further comprising:
a scope circuit for generating data for an eye-opening diagram, wherein the scope circuit receives an incoming data signal from a receiver circuit in the second series of circuits.

8. The programmable photonic-electronic integrated circuit of claim 1, further comprising:
a scope circuit for generating data for a constellation diagram, wherein the scope circuit receives an incoming data signal from a receiver circuit in the second series of circuits.

9. The programmable photonic-electronic integrated circuit of claim 1, further comprising:
a first transceiver in the first series of circuits; and
a second transceiver in the second series of circuits, wherein the first transceiver receives the plurality of outgoing data channels from a pulse amplitude modulation encoder circuit and outputs the plurality of outgoing data channels to the optical transmitter circuit, and wherein the second transceiver receives the plurality of incoming data channels from the optical receiver circuit and outputs the plurality of outgoing data channels to a pulse amplitude modulation decoder circuit.

10. The programmable photonic-electronic integrated circuit of claim 1, further comprising:
a first transceiver in the first series of circuits; and
a second transceiver in the second series of circuits, wherein the first transceiver receives the plurality of outgoing data channels from a quadrature amplitude modulation encoder circuit and outputs the plurality of outgoing data channels to the optical transmitter circuit, and wherein the second transceiver receives the plurality of incoming data channels from the optical receiver circuit and outputs the plurality of outgoing data channels to a quadrature amplitude modulation decoder circuit.

11. The programmable photonic-electronic integrated circuit of claim 10, further comprising:

an injection circuit coupled to the first transceiver, wherein the injection circuit injects jitter and/or noise into the plurality of outgoing data channels.

12. The programmable photonic-electronic integrated circuit of claim 10, wherein the programmable logic device further comprises:
memory that stores, and provides access to, data;
a processor that executes instruction code and that stores and accesses data from the memory; and
a bus system that is used to communicatively interconnect the memory, the processor, the first transceiver in the first series of circuits, the second transceiver in the second series of circuits, and the optical test interface unit.

13. The programmable photonic-electronic integrated circuit of claim 12, wherein the memory stores at least test patterns and measured waveforms.

14. The programmable photonic-electronic integrated circuit of claim 1, wherein the first and second series of circuits are electronically programmable.

15. A photonic-electronic integrated circuit chip with a field programmable gate array, the photonic-electronic integrated circuit comprising:
an optical test interface unit that transmits a plurality of outgoing data channels to, and receives a plurality of incoming data channels from, an optical device under test;
an optical transmitter circuit that modulates and transmits the plurality of outgoing data channels to the optical test interface unit;
an optical receiver circuit that receives and demodulates the plurality of outgoing data channels from the optical test interface unit;
a first series of circuits for encoding and serializing the plurality of outgoing data channels;
a second series of circuits for deserializing and programmably decoding the plurality of input data channels; and
a plurality of error rate tester circuits that compare outgoing data from the first series of circuits and incoming data from the second series of circuits to determine a plurality of error rates.

* * * * *